United States Patent [19]

Lewis, Jr.

[11] 4,348,060
[45] Sep. 7, 1982

[54] METHOD FOR MAKING A TUFTED BRUSH

[75] Inventor: John C. Lewis, Jr., Salisbury, Vt.

[73] Assignee: Tucel Industries, Inc., Forest Dale, Vt.

[21] Appl. No.: 242,190

[22] Filed: Mar. 10, 1981

Related U.S. Application Data

[60] Division of Ser. No. 59,479, Jul. 20, 1979, Pat. No. 4,291,431, which is a division of Ser. No. 924,643, Jul. 14, 1978, Pat. No. 4,189,189, which is a continuation-in-part of Ser. No. 757,564, Jan. 7, 1977, Pat. No. 4,109,965.

[51] Int. Cl.³ .................. B29C 17/02; B29C 27/02
[52] U.S. Cl. ........................................ 300/21; 15/160; 29/453; 264/243; 264/248; 264/322
[58] Field of Search .................... 156/297, 298, 303.1; 264/243, 248, 322, 339, 320; 300/21; 15/160; 29/453

[56] References Cited

U.S. PATENT DOCUMENTS

| 2,795,807 | 6/1957 | Salvy | 15/160 |
| 3,020,596 | 2/1962 | Clapp et al. | 264/322 |
| 3,128,487 | 4/1964 | Vallis | 15/160 |
| 3,604,043 | 9/1971 | Lewis | 300/21 |

Primary Examiner—Willard E. Hoag
Attorney, Agent, or Firm—LeBlanc, Nolan, Shur & Nies

[57] ABSTRACT

A method for making flared, tufted, brush constructions is disclosed. A plurality of synthetic filament tufts are picked, and the ends fused. Simultaneously, the fused ends are mounted parallel on a heat softened, thermoplastic support. Before the support cools, it is deformed to a convex configuration so that when the support cools, a flared, tufted construction is formed, suitable for mounting on a handle. The support may also be deformed to a concave configuration so that the tufts converge.

5 Claims, 24 Drawing Figures

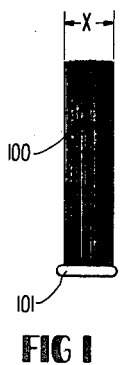
FIG 1
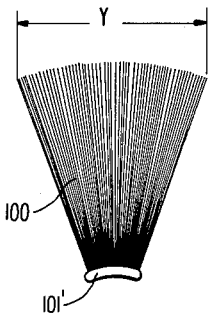
FIG 1A
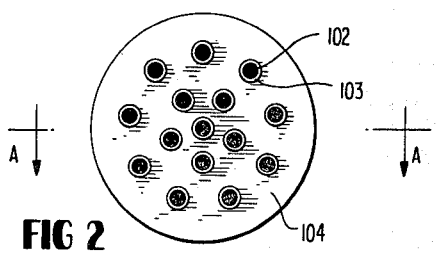
FIG 2
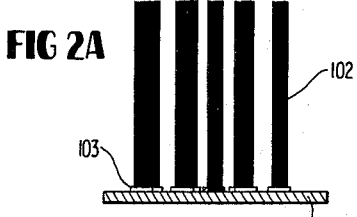
FIG 2A
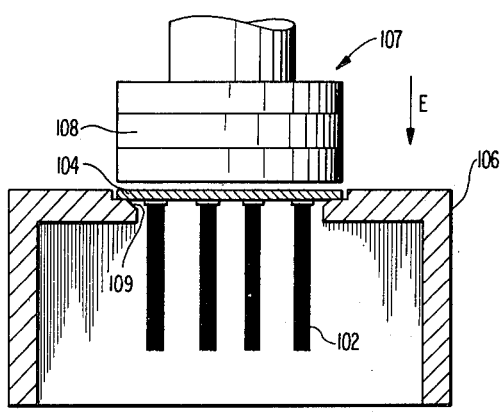
FIG 3
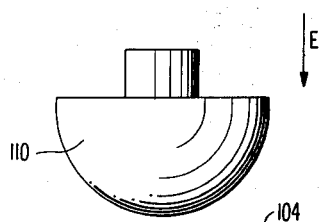
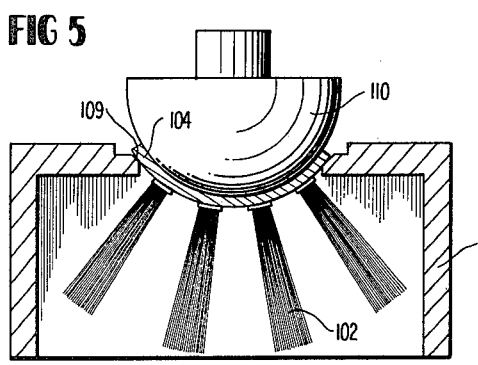
FIG 5
FIG 4

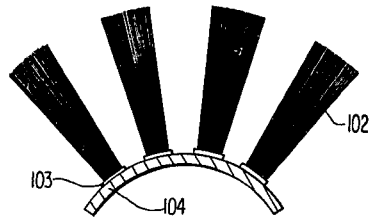
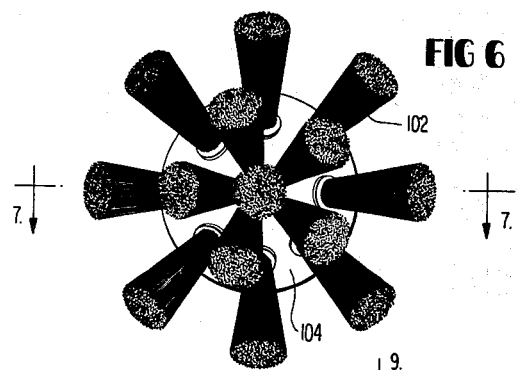
FIG 7
FIG 6
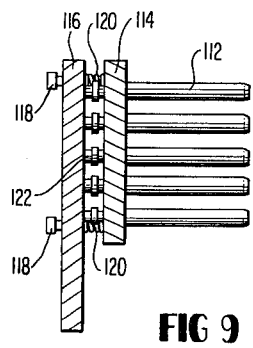
FIG 9
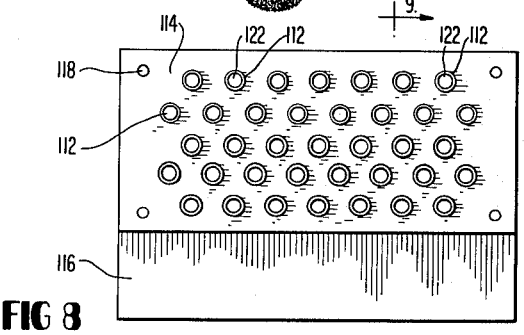
FIG 8
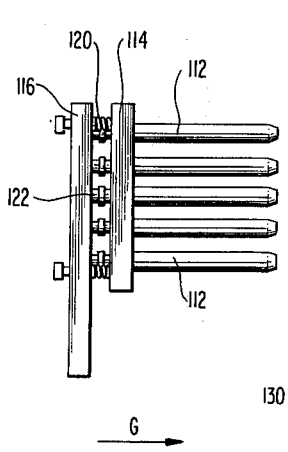
FIG 10
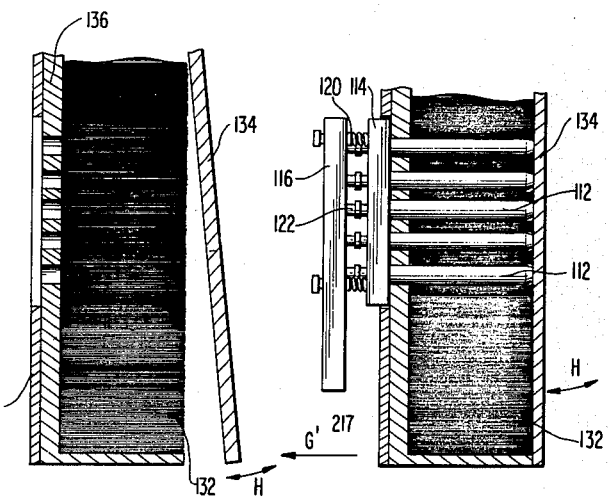
FIG 11

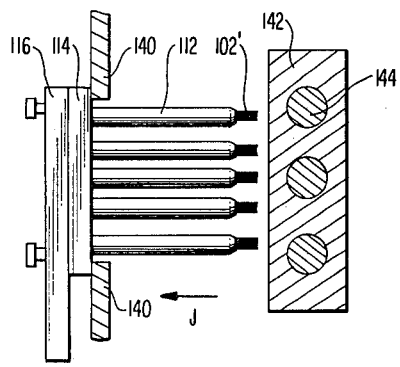
FIG 12
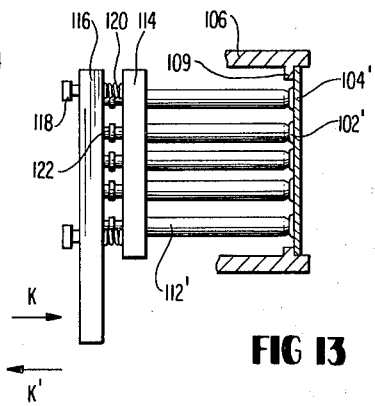
FIG 13
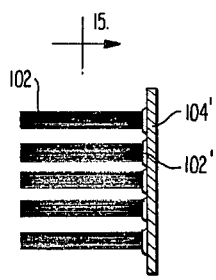
FIG 14
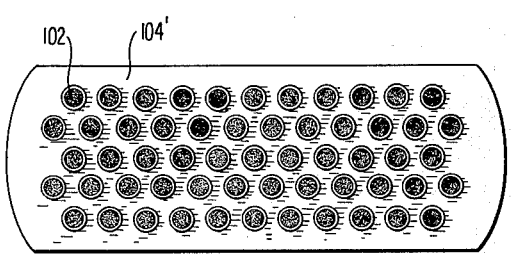
FIG 15
FIG 16
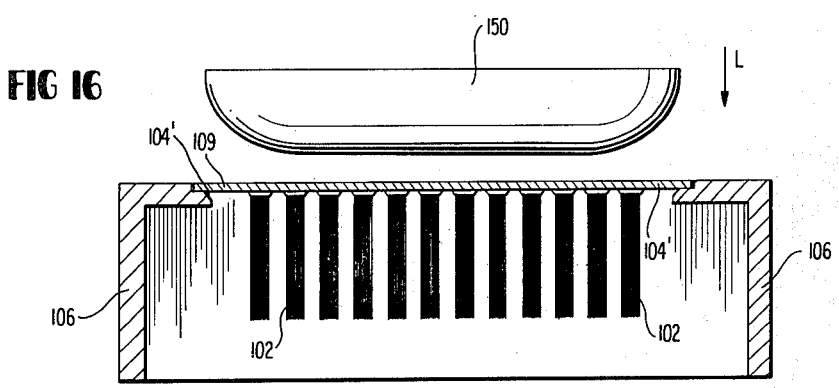

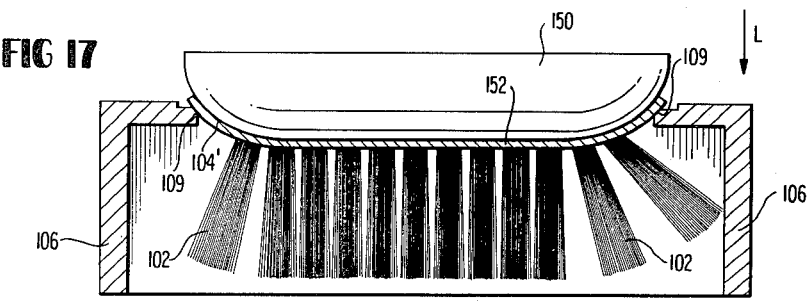
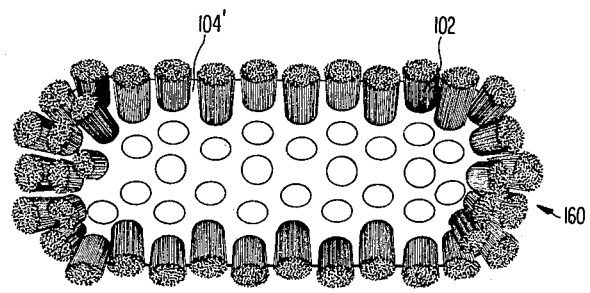
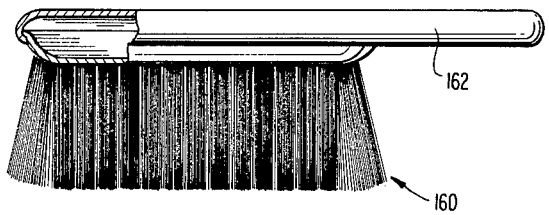
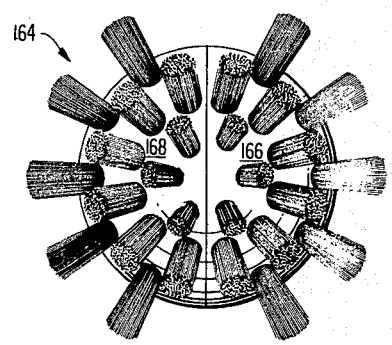
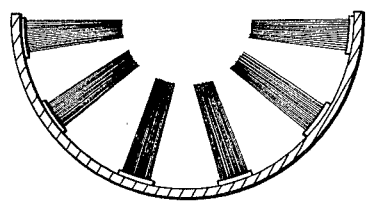
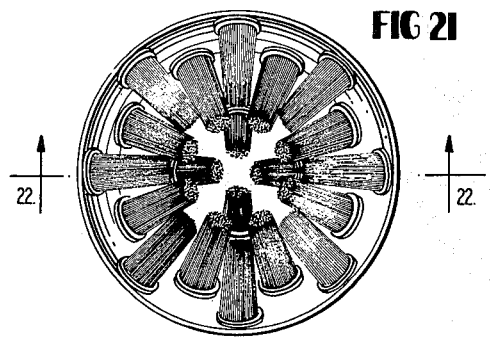

METHOD FOR MAKING A TUFTED BRUSH

This application is a division of application Ser. No. 59,479, filed July 20, 1979; now U.S. Pat. No. 4,291,431 which was a division of Ser. No. 924,643, filed July 14, 1978, now U.S. Pat. No. 4,189,189; and which application was a continuation-in-part of Ser. No. 757,564, filed Jan. 7, 1977, and now U.S. Pat. No. 4,109,965.

This invention relates to new and useful tufted brush constructions and machinery for continuously fabricating synthetic filament constructions. The apparatus is particularly adapted to form a wide variety of filament construction wherein the ends of the filament are fused and supported before they cool, so that the prefused ends only connect the filament unit and mount or hold the filament unit to the support in parallel attitude. Before the support cools it is deformed from behind thus causing all the filament tufts on the opposite side to change attitude from a parallel relationship to one in which each tuft is at a different angle from any adjacent tuft. The tufts may either diverge from a convex support to form a flared construction or converge from a concave support.

The Brush Industry and brush-making art during the past fifty years has remained, for the most part, unchanged. Major changes taking place have come about in raw materials employed, i.e. synthetic filaments replacing vegetable fibers, molded thermoplastic handles replacing wooden handles, and the like, but little or no change has taken place in forming tufts and/or tufting multi-tufted constructions. With the economic changes taking place during the 1970's and even more dependence upon oil and oil derivatives in the last 70's, i.e., plastics used for synthetic filament and molded brush blocks, and an ever increasing cost for energy and for these raw materials, a need developed for new ways to construct tufted synthetic brush products so that (1) up to at least 75% of the starting raw materials are used in construction and (2) the energy required to form these raw materials is minimized.

Picking device for fabricating tufted constructions from synthetic filaments are described in, for example, my U.S. Pat. No. Re. 27,455 and my U.S. Pat. No. 3,799,616, among others. However, the improved devices of the instant invention, used to fabricate novel tufted constructions, while outwardly similar to already patented constructions, have the additional capability of allowing one to pick and trim angleflared individual tufts and tufted construction wherein raw material conservation and utility are achieved.

For example, conventional tufted brushes comprise three raw materials: one, the handle; two, filament with a length more than twice the filament tuft length out of the handle; and three, a wire staple. Handle thicknesses of at least three-sixteenths inches previously had to be employed to accommodate drilled holes in order that the stapled tuft (held by wire staples) could be supported in the handle.

The brush construction of this invention, in contrast, comprises only a handle (support means) with thickness in the range of forty thousandths inches with filament attached thereto, and both are constructed preferably from polypropylene. Constructions can also be fabricated from materials such as polyurethane (support) and polyamide (filament) whereby these two materials will remain fused together to produce a polyamide (nylon) filament brush. It is not necessary in this instance to employ the expensive polyamide resin for both the handle and the filament thereby reducing the cost of the article.

It will be obvious to those skilled in the art that a wide variety of different filament constructions, in addition to ordinary household brushes, may be made utilizing the machinery of this invention to be hereinafter described. For example, the machinery of this invention may also be adapted to form tufted constructions wherein the prefused tuft end is mounted on a heat softened depression on a sheet or handle of the filamentary material.

Additional tufted constructions may also be formed wherein the prefused tuft end is mounted on a small diameter rod, or a woven and non-woven mesh. The rod or mesh may be wire, cellulose or plastic material, embedded in the prefused tuft end before the end cools.

Finally, the tuft may also be picked by or inserted through a sheet support exposing both the working and non-working ends of the tuft. The non-working end may then be heat-sealed to retain the tuft in or on the support.

Related articles and methods of construction are described and claimed in my U.S. Pat. Nos. 3,774,782; 3,633,974; Re. 27,455; 3,604,043; 3,799,616; 3,798,699; 3,910,637; 4,009,910 and my co-pending patent application Ser. No. 757,564, filed Jan. 7, 1977. The disclosure of the aforesaid related patents and patent application are hereby incorporated by reference.

Accordingly, it is therefore an object of this invention to provide new and useful brush making machinery adaptable for use in forming single tufts, multiple fiber tufts, completed brush or tufted components simultaneously formed, and continuous modular brush or tufted constructions.

It is another object of this invention to provide a machine which will simultaneously pick fiber tufts, assemble the tufts in a predetermined pattern, imparting a flare thereto and form an integral fiber tuft support modular tufted construction.

It is another object of this invention to provide a brush machine wherein a flared tufted construction is formed after the tufts have been assembled onto a thin plastic sheet.

It is a further object of this invention to provide a machine for forming tufted constructions including means for heat sealing the fiber tufts integral with a support.

It is further an object to provide a machine for making flared tufted constructions which assembles cut-to-length thermoplastic fiber into fiber tufts, each of said tufts having a prefused end for mounting and working end which does not require trimming.

These and other objects will become more readily apparent with reference to the appended drawings and following description wherein:

FIG. 1 is a side view of a fused tuft of this invention prior to flaring;

FIG. 1A is a side view of a flared tuft of this invention;

FIG. 2 is a top view of a tufted component prior to flaring;

FIG. 2A is a cross-sectional view of the tufted component taken along line A—A of FIG. 2;

FIG. 3 is a cross-sectional side view of a flaring apparatus illustrating the tufted component prior to flaring;

FIG. 4 is a cross-sectional view of the flaring apparatus illustrating the tufted component being flared;

FIG. 5 is a cross-sectional view similar to FIG. 4;

FIG. 6 is a perspective view of the tufted angle-flared component of this invention;

FIG. 7 is a cross-sectional view of the tufted component taken along line 7—7 of FIG. 6;

FIG. 8 is a front view of a tuft forming picker of this invention;

FIG. 9 is a cross-sectional view of a tuft forming picker taken along line 9—9 of FIG. 8;

FIG. 10 is a side view in partial section of the tuft forming picker of FIG. 8 prior to indexing into a filament stock box;

FIG. 11 is a side view in partial section of the tuft forming picker of FIG. 8 indexed into a filament stock box;

FIG. 12 is a side view in partial section of the tuft forming picker of FIG. 8 withdrawn from a filament stock box with the picking tube support and trim ends in a closed attitude and filament ends disposed against a melter block for fusing;

FIG. 13 is a side view in partial section of the tuft forming picker of FIG. 12 with fused tuft ends mounted on a support;

FIG. 14 is a cross-sectional view of the tufted component of FIG. 13.

FIG. 15 is a front view of the tufted component taken along line 15—15 of FIG. 14;

FIG. 16 is a cross-sectional view of the flaring apparatus illustrating the tufted component prior to flaring;

FIG. 17 is a cross-sectional view of the flaring apparatus after having flared the tufted component;

FIG. 18 is a perspective view of the tufted angle-flared brush component of this invention.

FIG. 19 is a side view in partial section of a tufted angle-flared count duster brush made in accordance with this invention.

FIG. 20 is a perspective view of a hollow, tufted angle-flared sphere made in accordance with this invention;

FIG. 21 is a front view of an alternative tufted construction; and

FIG. 22 is a cross-sectional view taken along lines 22—22 of FIG. 21.

With reference to the drawings and in particular to FIGS. 1 and 1A, the invention is directed to houseware brush articles and the like wherein synthetic filament tufts 100 are attached directly to a substrate 101. As described in my above-referenced patents and patent application, and as will be subsequently disclosed, the tufts are picked according to the process of this invention in parallel attitudes, simultaneously, and simultaneously the ends are heat sealed for mounting on a thin support. After the ends cool, the pickers are withdrawn to form an article as shown in FIG. 1. It has been discovered however that if the support 101, is deformed as shown in FIG. 1A, an angle flaring construction will be formed. Tufts 100 mounted on support 101 have a total width X.

When support 101 is deformed as support 101' in FIG. 1A, the tufts 100 then flare to have a maximum width Y as shown. Deforming the hot tufted support from behind and the angle flaring apparatus of this invention then forms a completed angled tufted construction in the same time required by conventional brush machinery to pick and staple set one or two fiber tufts. This new and novel method of tufting angled filament tufts is achieved by employing the machinery generally described in my above described patents and patent application with modifications as will be subsequently disclosed.

With reference to FIGS. 2-5, a method for forming the flared tufted construction of this invention is described as follows:

A circular tufted construction as shown in FIG. 2 consists of a series of parallel filament tufts 102 having fused ends 103 mounted on a thermoplastic sheet support 104. With reference to FIG. 3, the support 104 is then placed in an open mold 106. A heating means 107 which preferably may be a conventional cartridge heater 108 is then indexed in the direction E adjacent the surface of support 104. The heating means 107 then warms support 104 to a temperature of for example about 250° F.

Support 104 in a heat softened condition is then disposed in mold 106 with the periphery thereof adjacent angled mold edges 109.

With reference to FIG. 4, after the heating means 107 is withdrawn, a probe 110 is indexed in the direction F toward the warmed support 104. As probe 110, normally maintained at a temperature of below 75° F. is forced against support 104 as shown in FIG. 5, support 104 deforms against the angled edges 109. Support 104 then takes the curvature of probe 110 and the probe 110 is held against the support until the support cools, taking the same shape as the probe which simultaneously causes tufts 102 to be angle flared individually, each tuft at a different angle from each adjacent tuft as shown in FIG. 5.

When tuft support 104 is removed from mold 106, a complete angled flared construction results as illustrated in FIGS. 6 and 7.

FIGS. 8 and 9 illustrate one version of the tuft forming picking means of this invention, which is used to form the tufts, and mount the tufts on a support. The picking means consists of a plurality of picking tubes 112 mounted on a foraminous plate 114. Plate 114, in turn is mounted on a movable plate 116 by preferably bolts 118. Plates 114 and 116 are spaced by springs 120 which surround that portion of bolts 118 extending between plates 114 and 116.

A plurality of trim end elements 122 are mounted on plate 116 and extend through plate 114 into corresponding picker elements 112. Trim end elements 122 then slidably extend into elements 112 and serve as piston elements to index cut to length filament contained in picker tubes 112. As will be obvious to those skilled in the art, the end of element 122 will trim a tuft of filament contained within picker 112, automatically, and if plate 114 is indexed toward plate 116, elements 122 will force the ends of tufts contained in picker elements 112 outwardly to extend beyond the picker elements.

Elements 112 may assume any desired pattern. As shown in FIG. 8, the elements are disposed in a five row, staggered pattern. The pattern could be a circular pattern which would be used to produce the tufted construction of FIGS. 2-7.

FIGS. 10 and 11 illustrate use of the tuft forming picking means to form a plurality of tufts. With attention to FIG. 10, movable plate 116 carrying the picking elements is indexed in the direction G into a stock box 130. The stock box contains a plurality of cut to length synthetic fibers 132, and the back of the stock box mounts a plate 134 which is continually vibrated during the picking operation by a vibrator means (not shown). The internal surface of the stock box front mounts a gasket 136 having a plurality of openings for receiving the picking elements 112. As the vibrating plate 134 reciprocates in the direction H against the ends of the synthetic cut to length filament 132, the picking elements 112 enter the stock box 217 as shown in FIG. 11 whereby a plurality of filament 132 enter each of the picking elements 112 to form the tufts, and the ends of each said filament abut the ends of trim end pins 122 to trim the ends of the tufts formed within each picker tube 112. As the tufts are formed within the tube elements 112, the springs 120 on mounting bolts 118 maintain a spaced relationship between plates 114 and 116. After the picking elements 112 are filled, the movable plate 116 indexes in the direction G' withdawing the tubes from the stock box.

FIGS. 12–14 illustrate mounting of the tufts formed on a support to form a tufted construction. With attention to FIG. 12, after the picking elements 112 are filled, movable plate 116 is indexed in the direction I against closing bars 140 which causes plate 114 to close against plate 116, forcing trim elements 122 into picker tubes 112 and forcing an end of the tufts formed within the tubes 102' to emerge from each of the elements 112. The ends of the tubes 102 then contact a melter block surface 142 heated by cartridge heaters 144 which cause the filament ends 102' to fuse.

After fusing, the device of this invention, as illustrated in FIG. 13, indexes away from heater 140, and subsequently in the direction K into mold 106. The fused ends 102' of the tufts formed in picker elements 112 then encounter a heat softened plastic substrate 104'. The heated portions of the substrate and tuft then fuse and cool, causing the tufts to be attached to the substrate 104'. Movable plate 116 then indexes in the direction K' whereby the plastic substrate and tufts mounted thereon are retained in the open mold 106 by the edges 109, and the tufted construction of FIGS. 14 and 15 is formed. Tufts 102 are then attached in a parallel relationship with each other on a plastic substrate 104 and form the design or pattern of the picker elements 112 on mounting plate 114. Each tuft is individually fused at end portion 102' to the substrate 104'.

With attention to FIGS. 16 and 17, while the heat softened substrate 104' is held in the mold 106 and the plastic substrate is still warm from tufting, i.e., in the range of 200°–250° F., a flare forming die 150 is indexed in the direction L causing the warm plastic substrate 104' having parallel tufts 102 thereon, to take a new curved form as illustrated in FIG. 17 as a substrate 104' molds against the surface 152 of die 150 and against edges 109 of the mold 106. The parallel tufts 102 of FIG. 16, then diverge to form a flared tufted construction as shown in FIG. 17, whereby each tuft is at a different angle from each adjacent tuft along the entire substrate 104'.

With reference to FIGS. 18 and 19, when the substrate 104' cools, it may be removed from mold 106, and a flared tufted brush construction 160 is formed. The construction consists of a semi-rigid plastic substrate 104' mounting divering tufts 102 each of which is disposed at an angle different from each adjacent tuft.

As shown in FIG. 19, the tufted flared brush construction 160 may then be mounted on a hollow brush body 162 to form, for example, a counter duster brush. As will be obvious to those skilled in the art, the shape of the plastic substrate, and the handle, as well as the pattern of the flared brush tufts, may be varied within the scope of this invention to produce a wide variety of different flared, tufted constructions for mounting on brush handles.

The tufted constructions however need not be mounted on brush handles, and as shown in FIG. 20, a flared, tufted sphere 164 may be formed by utilizing the procedures described in conjunction with the FIGS. 2–7 to form twin hemispheres 166 and 168. These hemispheres may then be welded together to produce a spherical tufted brush.

The angle flaring frames and molds of this invention may be constructed from any conventional material such as polypropylene, polyacetal, polyamide and the like. The angle flaring dies may also be metal as will be obvious to those skilled in the art, and they are not limited to any given size, external diameter or dimension or cross-sectional configuration. Picking devices are not limited to any number of tufts and all angular configuration can be fabricated within the scope of this invention.

FIGS. 21 and 22 illustrate a tufted angular flared construction wherein the tufts converge from a concave substrate. The device shown in FIGS. 21 and 22 may be produced for example by utilizing a conventional vacuum mold in place of the die 150 shown in FIGS. 16 and 17.

It has been found that the angled, flared construction of this invention can be produced from tufts from assembled parallel, cut-to-length synthetic filament having any cross-sectional configuration such as circular, X-shaped, star shaped, hollow, and the like. The diameter of the filament picked ranges from 0.005" to at least 0.250". The length of the cut-to-length filament can range from 0.5" up to 30". The composition of the synthetic filament picked and assembled ino filament tufts is not limited, and thermoplastic filaments whether oriented or unoriented can be used to form tufts in accordance with this invention. Polymers such as polyamide, polypropylene, polyethylene, copolymers from polypropylene and ethylene, polyfluoride, polyurethane, and the like may be employed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A method for forming a tufted, flared brush construction wherein each tuft is disposed at an angle different from each adjacent tuft comprising:
   providing a thermoplastic sheet substrate, supporting said sheet at the edges thereof, and heating said sheet until it softens;
   providing a plurality of synthetic filament tufts, supporting said tufts in a mutually spaced parallel relationship, and heating a common end of each of said tufts, simultaneously, until each of said ends fuses;
   simultaneously fusing said ends of each of said tufts to a surface of said heat softened substrate to mount said tufts thereon in the parallel mutually spaced relationship;
   then deforming said heat softened sheet while supported only by the edges into a convex configuration to form said flared construction with said tufts extending outwardly therefrom.

2. The method of claim 1 wherein the step of supporting said sheet at the edges thereof further comprises providing a mold having upstanding walls defining an opening, the periphery of the opening defining a predetermined shape, said substrate being supported by said mold at said opening;

providing a die member having a convex surface, the periphery of said convex surface having the configuration of the opening in said die member;

supporting said sheet at the edges thereof and heating said sheet until it softens;

inserting said die member against the surface of said sheet to deform said sheet to conform to the configuration of said die member and extend through said opening in a convex configuration.

3. The method of claim 1 wherein the step deforming said heat softened sheet comprises providing a die having a convex surface, inserting said die into the surface of said heat softened sheet substrate opposite the surface mounting said tufts to deform said substrate into a configuration corresponding to the convex surface of said die.

4. The method of claim 3 wherein said die is at a temperature of less than about 75° F. when said die is inserted against the heat softened surface of said substrate, said method further comprising holding said die against said heat softened substrate until said substrate cools to form said tufted construction.

5. The process of claim 4 further comprising providing a brush handle, and mounting said tufted construction on said brush handle.

* * * * *